United States Patent [19]

Singh et al.

[11] Patent Number: 4,647,547
[45] Date of Patent: Mar. 3, 1987

[54] HIGH TEMPERATURE REFRACTORY OF MGCR$_2$O$_4$ MATRIX AND UNSTABILIZED ZRO$_2$ PARTICLES

[75] Inventors: Jitendra P. Singh, Bolingbrook, Ill.; Jawana J. James, West Lafayette, Ind.; John J. Picciolo, Lockport, Ill.

[73] Assignee: The United States of America as represented by the United States Department of Energy, Washington, D.C.

[21] Appl. No.: 807,097

[22] Filed: Dec. 10, 1985

[51] Int. Cl.$^4$ ............................................. C04B 35/04
[52] U.S. Cl. ................................... 501/103; 501/110; 501/117
[58] Field of Search ................ 501/105, 103, 110, 117

[56] References Cited

U.S. PATENT DOCUMENTS

| | | |
|---|---|---|
| 2,231,944 | 2/1941 | Pole . |
| 3,192,058 | 6/1965 | Davies et al. . |
| 3,281,137 | 10/1966 | Alper et al. .......................... 501/117 |
| 3,293,053 | 12/1966 | Alper et al. .......................... 501/117 |
| 3,309,209 | 3/1967 | Martinet et al. ..................... 501/117 |
| 3,475,352 | 10/1969 | Barbier et al. ....................... 252/520 |
| 3,657,063 | 4/1972 | Brown et al. ......................... 501/103 |
| 3,837,870 | 9/1974 | Recasens et al. . |
| 4,141,743 | 2/1979 | Grubbs . |
| 4,298,385 | 11/1981 | Chaussen et al. ................... 501/105 |
| 4,322,249 | 3/1982 | Claussen et al. .................... 501/105 |
| 4,374,897 | 2/1983 | Yamaguchi ........................... 501/103 |
| 4,492,766 | 1/1985 | Zverina ................................. 501/104 |
| 4,533,647 | 8/1985 | Tien ...................................... 501/105 |

FOREIGN PATENT DOCUMENTS

| | | | |
|---|---|---|---|
| 57-165752 | 10/1982 | Japan .................................... | 338/34 |
| 1118073 | 6/1968 | United Kingdom . | |
| 540845 | 2/1977 | U.S.S.R. . | |
| 554252 | 6/1977 | U.S.S.R. ............................... | 501/103 |
| 685650 | 9/1979 | U.S.S.R. . | |
| 1085961 | 4/1984 | U.S.S.R. ............................... | 501/117 |

OTHER PUBLICATIONS

Singh, J. P. et al, "Fracture Toughness of MgCr$_2$O$_4$-ZrO$_2$ Composite", presented at American Ceramics Society 9th Annual Conference on Composites and Advanced Ceramics Materials, Cocoa Beach, Fla. on Jan. 20-24, 1985; Report No. ANL/FE-85-01 dated Aug. 1985.

Davidge, R. W. et al. "The Strength of Two-Phase Ceramic/Glass Materials", Journal of Materials Science, vol. 3, pp. 629-634, (1968).

Primary Examiner—Helen M. McCarthy
Attorney, Agent, or Firm—William Lohff; James W. Weinberger; Judson R. Hightower

[57] ABSTRACT

A high chromia refractory composite has been developed with improved thermal shock resistance and containing about 5-30 wt. % of unstabilized ZrO$_2$ having a temperature-dependent phase change resulting in large expansion mismatch between the ZrO$_2$ and the chromia matrix which causes microcracks to form during cooling in the high chromia matrix. The particle size preferably is primarily between about 0.6-5 microns and particularly below about 3 microns with an average size in the order of 1.2-1.8 microns.

4 Claims, 6 Drawing Figures

Effect of ZrO$_2$-B Content on Thermal-Shock Behavior of MgCr$_2$O$_4$.

Typical Scanning Electron Micrograph of Fracture Surface of $MgCr_2O_4$.

Typical Scanning Electron Micrograph of Fracture Surface of $MCr_2O_4 + 7\%$ $ZrO_2$-B Composites.

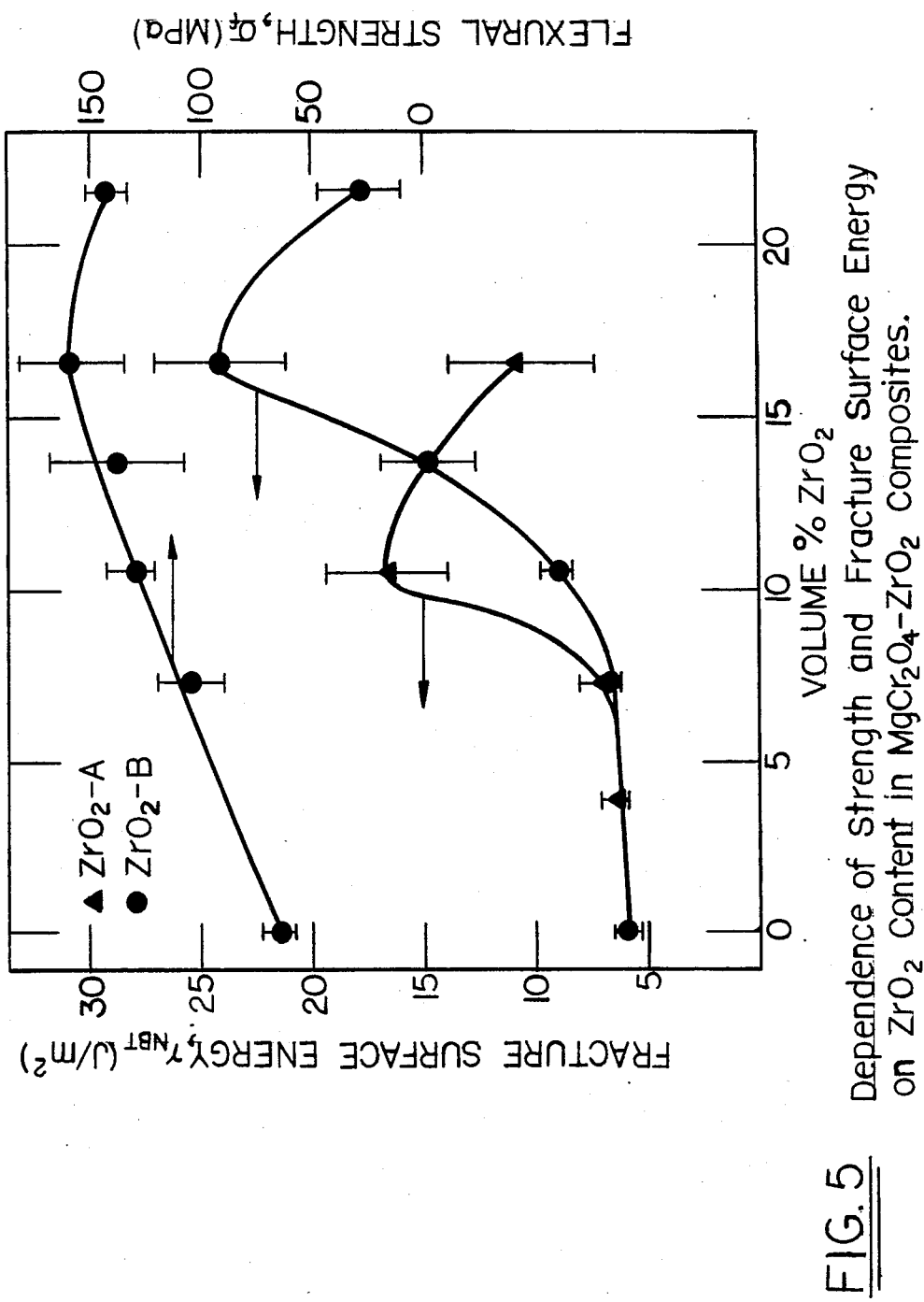
FIG. 5 Dependence of Strength and Fracture Surface Energy on ZrO₂ Content in MgCr₂O₄-ZrO₂ Composites.

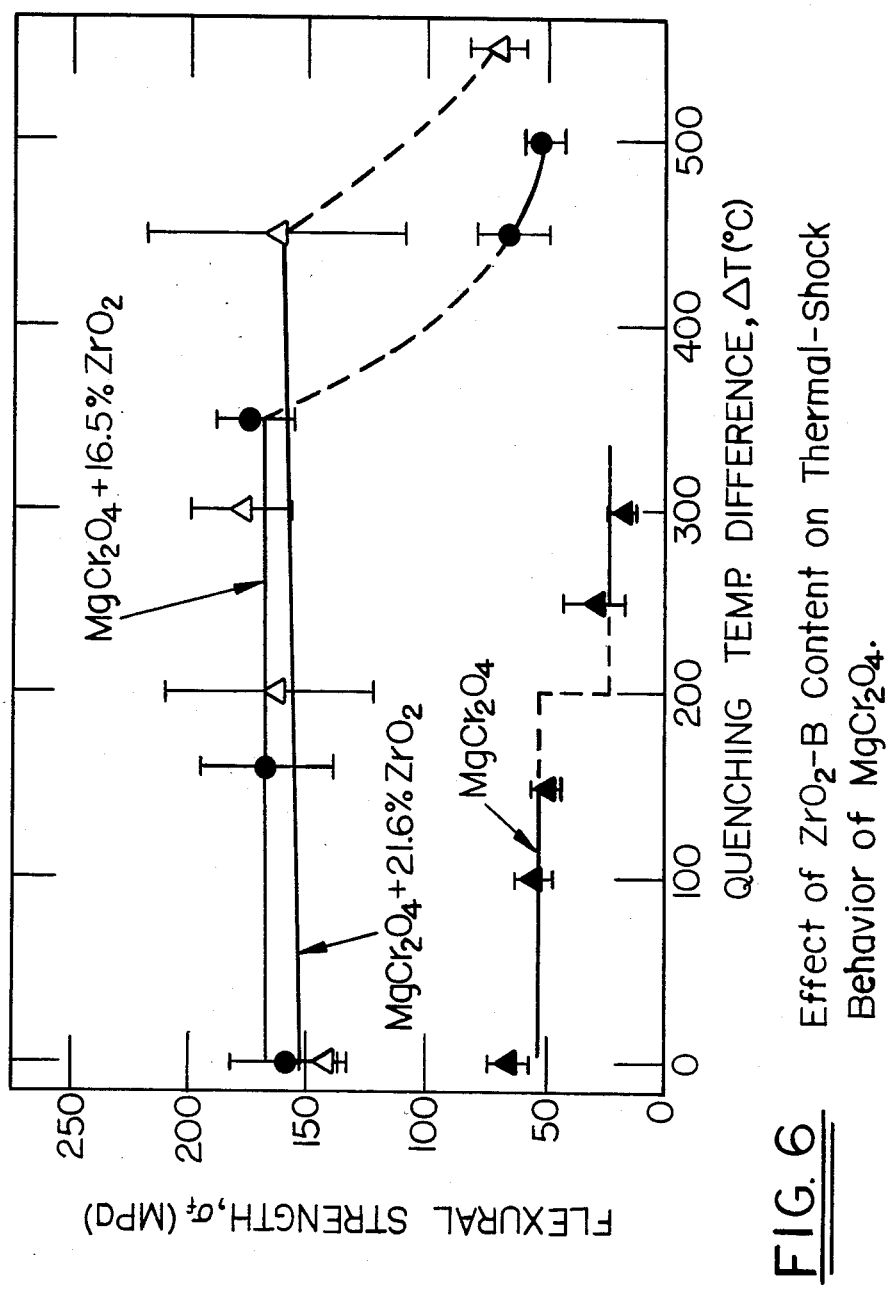
FIG. 6 Effect of ZrO₂-B Content on Thermal-Shock Behavior of MgCr₂O₄.

HIGH TEMPERATURE REFRACTORY OF $MGCR_2O_4$ MATRIX AND UNSTABILIZED $ZRO_2$ PARTICLES

CONTRACTUAL ORIGIN OF THE INVENTION

The U.S. Government has rights in this invention pursuant to Contract No. W-31-109-ENG-38 between the U.S. Department of Energy and The University of Chicago representing Argonne National Laboratory.

BACKGROUND OF THE INVENTION

This invention relates to refractory composites useful at high temperatures under corrosive environments and more particularly to high chromia-content refractories whose resistance to thermal shock-induced damage is improved by minor amounts of an additive such as $ZrO_2$ having a temperature dependent phase change.

One use of refractory composites has been as refractory linings for the main pressure vessels of coal gasification systems operated to form synthetic natural gas from coal. In some systems and particularly slagging coal gasifiers, the linings are subject to corrosive environments from molten slag together with thermal shock associated with temperature fluctuations which may vary between 1400°–1750° C. Under these conditions, refractory failure may occur by corrosion, cracking, and spalling thereby reducing the service life of the lining.

High-chromia refractories have been developed with good resistance to corrosion from molten slag and therefore have advantages for use in slagging coal gasifiers. These refractories may be characterized by a $Cr_2O_3$ content of greater than 50 wt. % with the $Cr_2O_3$ being incorporated and/or mixed with other metal oxides such as ZnO, MgO, $Al_2O_3$, $SiO_2$, $Na_2O$, CaO, and the like. The particle size is in the order of 4–6 microns and above.

In the prior art, chromia compositions have also included various amounts of $ZrO_2$ added for various purposes. In general, the $ZrO_2$ has been in the stabilized form which has a limited dimensional change with temperature. Also, the presence of certain metal oxides such as CaO, MgO, $Na_2O$ and the like in the refractory compositions tend to keep $ZrO_2$ in stabilized form. As one illustration, U.S. Pat. No. 2,231,944 discloses a composition of 40–60 mole % CaO, 20–30 mole % $Cr_2O_3$ and 20–30 mole % $ZrO_2$ to impart resistance to hydration to the refractory. Another U.S. Pat. No. 3,837,870 discloses a composition of 1–74 wt. % $Cr_2O_3$, 15–40 wt. % stabilized $ZrO_2$, 3–76 wt. % $Al_2O_3$ and 7.5–20 wt. % $SiO_2$ for use in glass furnaces. U.S. Pat. No. 4,374,897 discloses a composition with 20–99 wt. % $Cu_2O_3$ and various amounts of $ZrSiO_4$, $ZrO_2$ or $SiO_2$ made in a carbon reduction atmosphere to provide a high density chromium oxide-based sintered body. From the description regarding $ZrSiO_4$ and $SiO_2$, the additives have low coefficients of thermal expansion with good heat shock resistance to compensate for some of the limitations of $Cr_2O_3$. Russian Pat. No. 554,252 also discloses a composition of 75–92 wt. % magnesite-chromite clinker, 3–5 wt. % binder and 5–20 wt. % acicular $ZrO_2$. Other patents related to the addition of $ZrO_2$ to $Cr_2O_3$ or $Cr_2O_3$ to $ZrO_2$ are U.K. Pat. No. 1,118,073; U.S. Pat. Nos. 3,192,058; 3,281,137; 3,293,053; 3,309,209; 3,475,352; 4,141,743; and 4,492,766.

As reported in the above identified prior art, high chromia refractories provide good corrosion resistance to molten slag; however, they have limited resistance to thermal shock.

Another factor of importance for refractory composite compositions is that the particle size of the inclusions be small and have a narrow and uniform distribution. With the larger and nonuniform particle size distribution of the inclusions, the performance may become adversely effected.

Accordingly, one object of the invention is a high chromia refractory with improved resistance to thermal shock. A second object is a high chromia refractory with a combination of good corrosion resistance and thermal shock resistance.

SUMMARY OF THE INVENTION

Briefly, the invention is directed to a high chromia refractory composite containing an unstabilized additive characterized by a temperature dependent phase change resulting in large expansion mismatch between the additive and the chromia matrix which by inference from the test data causes microcracks to form during cooling in the high chromia matrix. The preferred additive is unstabilized $ZrO_2$ with the preferred matrix being $MgCr_2O_4$. Unstabilized $ZrO_2$ differs from the stabilized form by being characterized by a phase change during cooling at approximately 1030° C. which causes a significant volume increase with an associated linear expansion of $\sim 1.4\%$. The preferred addition of $ZrO_2$ is in the order of 4–25 vol. % based on tests with a composite containing essentially only $MgCr_2O_4$ and $ZrO_2$. While not directly related to wt. %, a vol. % of approximately 4–25 in general results in a weight range of about 5–30 wt. % for this composite. The particle size preferably is primarily between about 0.6–5 microns and particularly below about 3 microns with an average size in the order of 1.2–1.8 microns.

BRIEF DESCRIPTION OF THE DRAWINGS

FIG. 5 is a graph of strength and fracture surface energy as a function of $ZrO_2$ (FIGS. 3–4) content for the $MgCr_2O_4$-$ZrO_2$ refractory composites.

FIG. 6 is a graph of flexural strength versus quenching temperature difference ($\Delta T°$ C.) for the $MgCr_2O_4$-$ZrO_2$-B refractory composites.

DETAILED DESCRIPTION OF THE PREFERRED EMBODIMENT

Figure 1:
FIG. 1 is a scanning electron micrograph of a $MgCr_2O_4$ refractory.

In the literature, improvement in thermal shock resistance appears to have been accomplished based on different mechanisms and/or theories. In the aforementioned U.S. Pat. No. 4,374,897, the low coefficient of thermal expansion of the additive appears to reduce the net thermal expansion coefficient of the body of $Cr_2O_3$ with additive as compared with pure $Cr_2O_3$. Low thermal expansion coefficient, in general, results in improved thermal shock resistance. In another experiment involving a ceramic matrix primarily composed of MgO, particles of the metal W have been added with the resultant large shrinkage of W with respect to MgO appearing to form microcracks during the cooling of the ceramic. Appropriate microcracking caused by shrinkage of the W particles may improve thermal shock resistance. However, one of the limitations of W additives is the eventual oxidation of the metal. In addition, unstabilized $ZrO_2$ has been used to toughen $Al_2O_3$ ceramics. In general, toughening results in resistance to cracking and particularly large scale cracking or significant extension of smaller cracks.

In this invention, the inventor has determined that the thermal shock resistance of high chromia refractory compositions and particularly $MgCr_2O_4$ refractories is increased significantly by the addition of unstabilized $ZrO_2$ in an amount varying between about 5–30 wt. % (4–25 vol. % and at a particle size limited primarily between about 0.6–5 microns and particularly between about 0.6–3 microns. The benefit appears to be provided by the phase change and the resulting large volume increase of the $ZrO_2$ particles which induces microcracks in the adjacent matrix of the chromia composition at a $ZrO_2$ content above about 7 vol. % and below about 30 vol. % based on the total volume of $MgCr_2O_4$ and $ZrO_2$ composite. The value of a critical minimum dimension of 0.6 microns for $ZrO_2$ to induce microcracks is established based on the analysis of Davidge and Green in the "The Strength of Two-Phase Ceramic/Glass Materials", J. Mater. Sci. 3, 629–634 (1968). Also, as illustrated in FIGS. 3–6, the particle size, if maintained primarily below about 7 microns, provides a large increase in the strength, fracture surface energy and resistance to thermal shock.

The high chromia refractories are generally characterized by a $Cr_2O_3$ content of at least about 50 wt. % In this invention, a $Cr_2O_3$ content of at least about 55 wt. % is preferred. High chromia also identifies high temperature metal chromites such as $MgCr_2O_4$, $LaCrO_3$ and $FeCr_2O_4$, as well as $Cr_2O_3$. $MgCr_2O_4$ is a compound of particular interest since it has been reported to exhibit particularly good corrosion resistance with $MgCr_2O_4$ as the chromite, a preferred weight percent is at least about 70 wt. %. The $ZrO_2$ used in this invention is in unstabilized form and its content is in the range of about 5–30 wt. % and more particularly about 10–25 wt. %.

The refractory composition may also include some refractory materials such as $Al_2O_3$, $TiO_2$, $SiO_2$, and the like in amounts of about 1–25 wt. %. However, any oxides such as CaO, $Na_2O$, MgO and the like should be avoided to maintain $ZrO_2$ in the unstabilized form. Binders in amounts of about 2–10 wt. % and preferably about 5 wt. % are used as is customary in this art. Suitable binders are polyethylene glycol, polyvinyl alcohol, and a mixture of acryloid-stearic acid.

Figure 3:
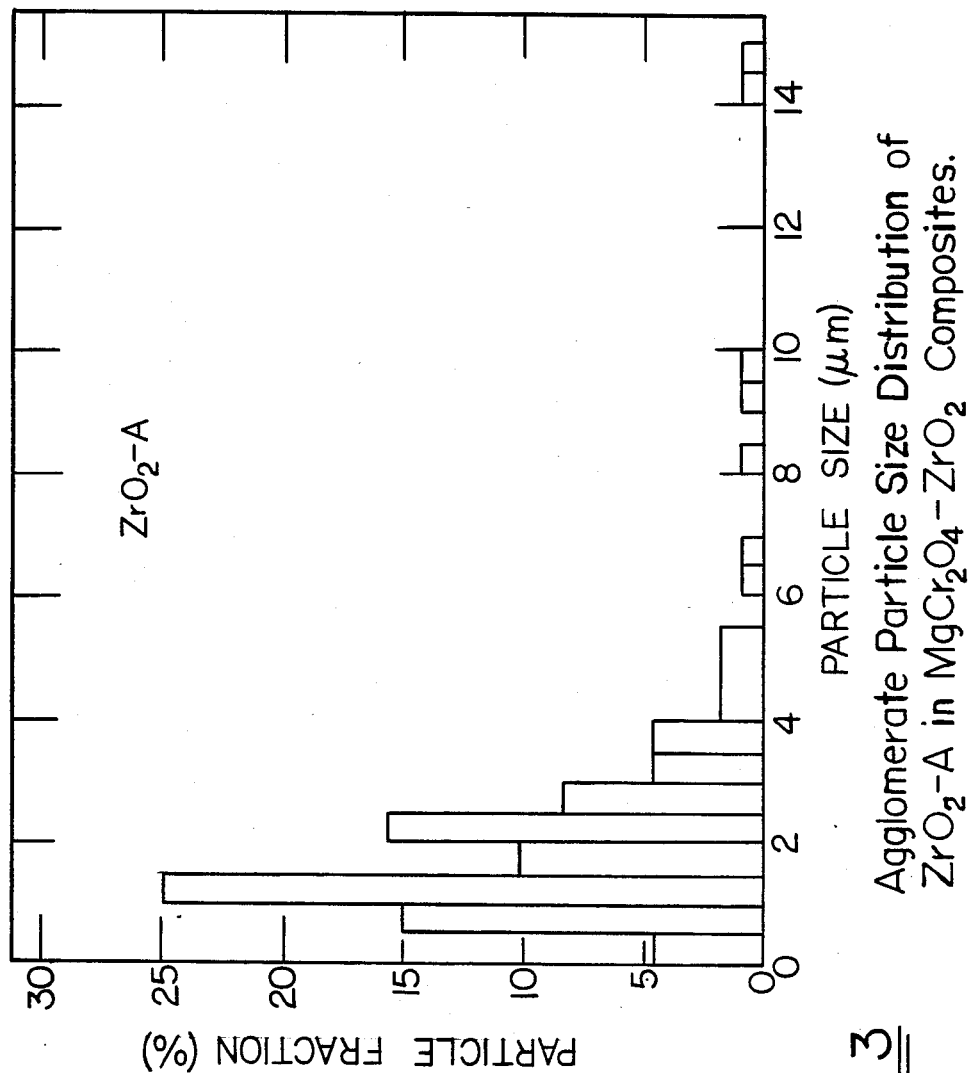
FIG. 3 is a graph of the typical particle size distribution for one sample of $ZrO_2$ (identified as $ZrO_2$-A) used in the preparation of a $MgCr_2O_4$-$ZrO_2$ refractories having a $ZrO_2$ content between about 3.8–16.5 vol. %.
Figure 4:
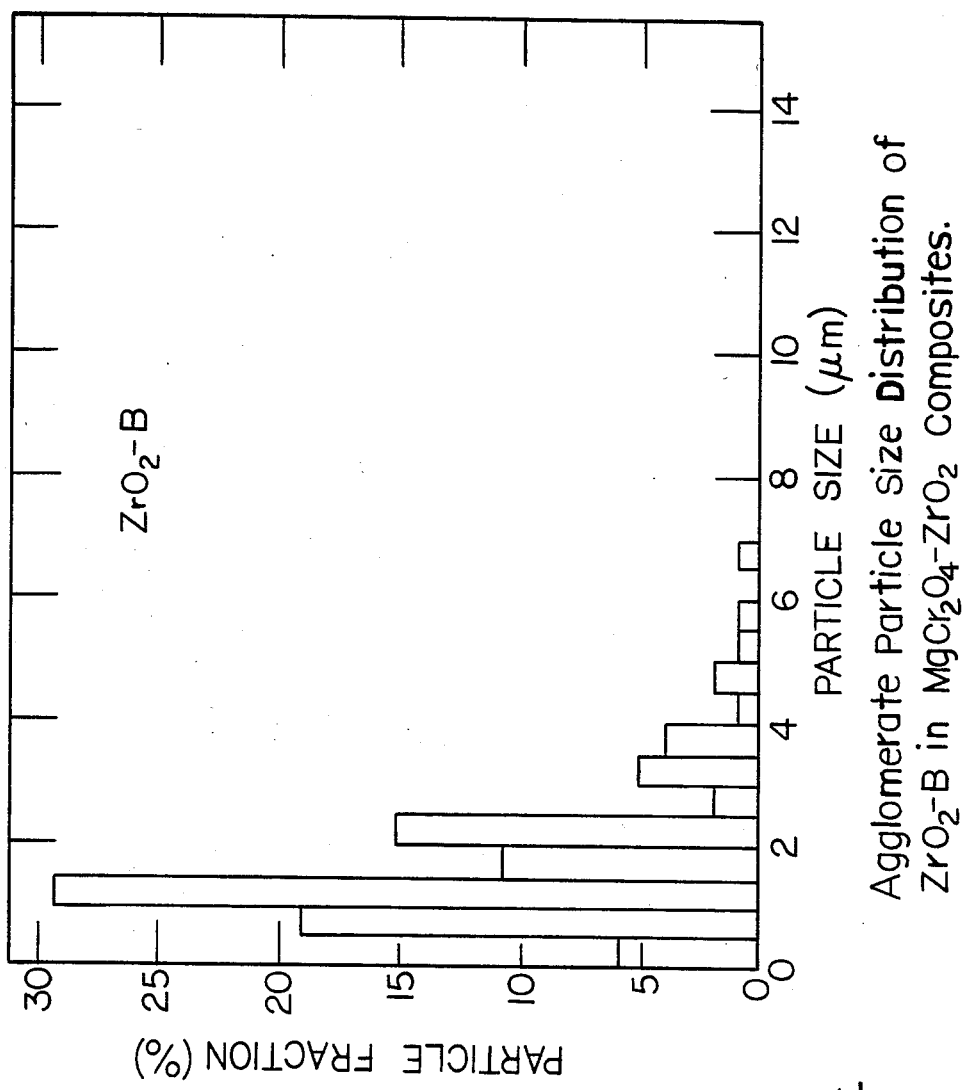
FIG. 4 is a graph of the typical particle size distribution for a second sample of $ZrO_2$ (identified as $ZrO_2$-B) used in the preparation of a second $MgCr_2O_4$-$ZrO_2$ refractory of the type illustrated in FIG. 2 and having a $ZrO_2$ content between about 3.8–21.6 vol. %.

Preferably, the particles of $ZrO_2$ have a size primarily below about 7 microns and especially below about 3 microns. FIGS. 3–4 together with FIGS. 5–6 illustrate the improved resistance to thermal shock provided by the composition ($ZrO_2$-B) having the narrow range of particle size and reduced content of large particle of $ZrO_2$ inclusions. The particles should also be above the calculated critical size of about 0.6 microns.

In preparing the composition prior to sintering a relatively uniform mixture is prepared from $Cr_2O_3$ and/or $MgCr_2O_4$, $ZrO_2$, any additional additives, and a sintering aid. In general, mixing times are in the order of 16 hours. The powder mixture is then pressed at 83 $MN/m^2$ to form a green compact. The green compact is then sintered by heating to temperatures in the range of about 1615°–1700° C. and preferably about 1650° C. for about 1½ hours and formed into a dense refractory product. The sintering is carried out in an atmosphere with reduced oxygen content with oxygen partial pressures being about $10^{-10} - 10^{-12}$ atm.

The following examples are provided for illustrative purposes and are not intended to be restrictive as to the scope of the invention.

EXAMPLES I-VI

Refractory products were prepared from $MgCr_2O_4$ and from mixtures of $MgCr_2O_4$ and unstabilized (monoclinic) $ZrO_2$. The $MgCr_2O_4$ was prepared by mixing dried $MgCO_3$ and $Cr_2O_3$ powders (both Laboratory grade) and then calcining the mixture at about 1200° C. for about 4 hours in air. The $MgCr_2O_4$ structure was identified by X-ray analysis. The $MgCr_2O_4$-$ZrO_2$ composites were prepared by mixing the $MgCr_2O_4$ with $ZrO_2$ (in the amounts between 0–25 vol. % as listed in Table I) and then we ball milling the mixture in methanol for about 16 hours with $Al_2O_3$ balls. The wet mixture was dried in air and then mixed with a 5 wt. % acryloid-stearic acid (approximately 4:1 by weight) binder system dissolved in methanol with the methanol being slowly evaporated from the mixture by slow heating.

Figure 2:
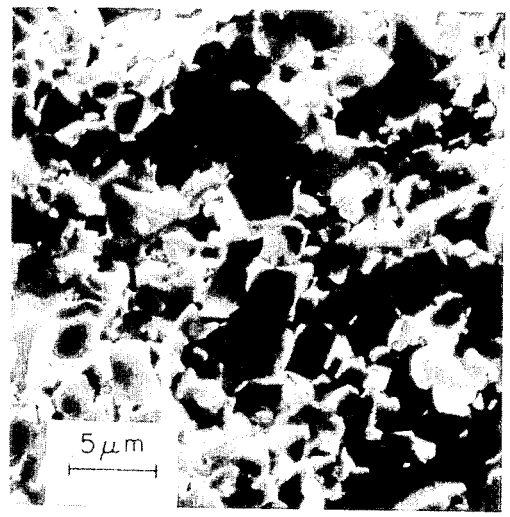
FIG. 2 is a scanning electron micrograph of a $MgCr_2O_4$-$ZrO_2$ refractory (about 7 vol. % $ZrO_2$) as one embodiment of the invention.

The dry mixture was sieved through a 30-mesh screen. Rectangular bar specimens (approximately 5.1×0.6×0.3 and 5.1×0.6×0.6 cm) of $MgCr_2O_4$-$ZrO_2$ composites were pressed in a steel die at about 83 $MN/m^2$. These bars were then sintered at about 1650° C. for about 1½ hours at oxygen partial pressure of about $10^{-12}$ atm. The sintered bar specimens of $MgCr_2O_4$ and its composites had relatively fine and uniform microstructures as shown in FIGS. 1 and 2.

The smaller bars were used to measure strength in a four-point bending mode (in an Instron Machine) with a support span of about 38 mm, a loading span of about 22 mm, and a crosshead speed of about 1.3 mm/min. The larger bars (5.1×0.6×0.6 cm) were used to measure fracture toughness ($K_{IC}$) by a standard notched-beam technique (NBT) with a notch width of about 0.4 mm. The elastic modulus (E) was measured by the pulse-echo technique. The fracture surface energy ($\gamma$) was calculated from the relation $\gamma = K_{IC}^2/2E$ for plane stress conditions. Table I provides a summary of the measured values of flexural strength ($\sigma_f$) elastic modulus (E), fracture toughness ($K_{IC}$) and fracture surface energy ($\gamma$) as a function of $ZrO_2$ content for $MgCr_2O_4$-$ZrO_2$-B composites.

TABLE I

Measured Properties of $MgCr_2O_4$—$ZrO_2$ Composite Specimens[a] with Different Volume Fractions of $ZrO_2$ Inclusions

| $ZrO_2$ (vol. %) | Flexural Strength, $\sigma_f$ ($MN/m^2$) | Elastic Modulus E ($GN/m^2$) | Critical Stress Int. Factor, $K_{IC}$ ($MN/m^{3/2}$) | Fracture Surface Energy, [b]$\gamma$NBT ($J/m^2$) With $ZrO_2$—B | With $ZrO_2$—A |
|---|---|---|---|---|---|
| 0 | 66 ± 7 | 158 ± 2 | 1.36 ± 0.05 | 5.9 ± 0.4 | 5.9 ± 0.4 |
| 3.8 | 120± 15 | 175 ± 2 | 1.49 ± 0.06 | 6.4 ± 0.5 | 6.4 ± |

TABLE I-continued

Measured Properties of $MgCr_2O_4$—$ZrO_2$ Composite Specimens[a] with Different Volume Fractions of $ZrO_2$ Inclusions

| $ZrO_2$ (vol. %) | Flexural Strength, $\sigma_f$ ($MN/m^2$) | Elastic Modulus, E ($GN/m^2$) | Critical Stress Int. Factor, $K_{IC}$ ($MN/m^{3/2}$) | Fracture Surface Energy, [b]$\gamma NBT$ ($J/m^2$) With $ZrO_2$—B | With $ZrO_2$—A |
|---|---|---|---|---|---|
| 7.3 | 105 ± 15 | 186 ± 3 | 1.54 ± 0.02 | 6.3 ± 0.1 | 6.9 ± 1.1 |
| 10.6 | 132 ± 11 | — | 1.79 ± 0.06 | 8.9 ± 0.6 | 16.6 ± 2.8 |
| 13.6 | 137 ± 31 | 174 ± 0 | 2.26 ± 0.17 | 14.8 ± 2.2 | 14.6 ± 0.6 |
| 16.5 | 154 ± 25 | 166 ± 3 | 2.84 ± 0.18 | 24.2 ± 3.0 | 8.5 ± 2.7 |
| 21.6 | 132 ± 31 | 166 ± 1 | 2.42 ± 0.13 | 17.7 ± 1.9 | |

[a]$ZrO_2$—B, except as noted.
[b]$\gamma NBT$ was calculated from the measured value of $K_{IC}$.

For the purpose of comparison, the values of fracture surface energy ($\gamma$) for $MgCr_2O_4$-$ZrO_4$-A composites are also shown in Table I. The decrease in elastic modulus values for $ZrO_2$ contents greater than about 7.3 vol. % indicates the existence of microcracking in the $MgCr_2O_4$ matrix due to $ZrO_2$ inclusions. The initial increase in the elastic modulus value appears to be due to the higher elastic modulus of $ZrO_2$ (~200 $GN/m^2$) as compared with pure $MgCr_2O_4$ (~160 $GN/m^2$) and the very limited microcracking.

FIG. 5 illustrates the dependence of flexural strength ($\sigma_f$) and fracture surface energy ($\gamma$) (from Table I) on the volume fraction of $ZrO_2$-B. For the purpose of comparison, the fracture surface energy results for composites with $ZrO_2$-A are also included in FIG. 5. These results indicate that there is little change in $\gamma$ for $ZrO_2$-B contents $\leq$7.3 vol. %, probably because there is little or no microcracking in the matrix for these compositions. At higher $ZrO_2$ contents, interaction between the stress fields of adjacent $ZrO_2$ particles may have resulted in a critical stress condition at the matrix-inclusion interface and consequent microcracking of the matrix. At 16.5 vol. % $ZrO_2$-B content, $\gamma$ reached a maximum value of 24.2 $J/m^2$. This represents a approximately fourfold increase in the fracture surface energy of $MgCr_2O_4$ with $ZrO_2$ inclusions as compared with the value of $MgCr_2O_4$ without any inclusions. The fracture surface energy ($\gamma$) of composites of $MgCr_2O_4$ with $ZrO_2$-A showed a similar dependence on $ZrO_2$ content with a maximum $\gamma$ value of 16.6 $J/m^2$ (see FIG. 5). This represents an approximately 2.5-fold increase in $\gamma$ as compared to a fourfold increase with $ZrO_2$-B inclusions. This difference is believed to be due to the difference in agglomerate particle size distribution for the two types of $ZrO_2$ inclusions. The larger nonuniform agglomerates for $ZrO_2$-A (FIG. 3) may have caused the formation of large nonuniform microcracks, which resulted in lower fracture surface energy as compared to composites with $ZrO_2$-B inclusions. The strength plot in FIG. 5 shows similar trends, i.e., the strength increases with increasing $ZrO_2$ content, reaches a maximum value of 154 $MN/m^2$ at 16.5 vol. % $ZrO_2$-B content, and starts to decrease for $ZrO_2$-B contents greater than 16.5 vol. % because of macrocrack formation.

The increase in both $\gamma$ and strength in the present work appears to be due to the small size and uniform distribution of the microcracks, which result from the small size and uniform distribution of the $ZrO_2$ inclusions.

In view of the fourfold increase in the value of $\gamma$ for $MgCr_2O_4$ with $ZrO_2$-B, $MgCr_2O_4$-$ZrO_2$-B composites were tested to evaluate the improvements in their thermal-shock resistance. In this test, the samples were heated to predetermined temperatures and quenched in a cold silicone oil (5 centistokes) bath. Subsequently, strength of the quenched specimens were measured in four point bending mode.

The results of the thermal-shock experiments are presented in FIG. 6, which shows the retained strength of the refractory composite specimens subjected to varying degrees of thermal quench ($\Delta T$). The results indicate a substantial improvement in the thermal-shock resistance of $MgCr_2O_4$-$ZrO_2$ composites as compared with pure $MgCr_2O_4$. The value of the critical quenching temperature difference ($\Delta T_c$) for strength degradation due to thermal shock is approximately 350° C. for $MgCr_2O_4$—16.5 vol. % $ZrO_2$ and approximately 450° C. for $MgCr_2O_4$—21.6 vol. % $ZrO_2$, as compared to approximately 200° C. for pure $MgCr_2O_4$. The retained strength after thermal shock for the composite specimens is also higher than that for pure $MgCr_2O_4$.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of this invention in which an exclusive property or privilege is claimed are defined as follows:

1. A sintered refractory product consisting essentially of $MgCr_2O_4$ as a matrix and about 5–30 wt. % unstabilized $ZrO_2$ formed from particles of $ZrO_2$ having an average size below about 5 microns and above about 0.6 microns.

2. The refractory product of claim 1 wherein the particles of $ZrO_2$ have a size distribution primarily below about 2 microns.

3. The refractory product of claim 2 containing microcracks adjacent the particles of $ZrO_2$.

4. The refractory product of claim 1 consisting essentially of said $MgCr_2O_4$, $ZrO_2$ wherein the particles of $ZrO_2$ range in size between about 0.6–3 microns.

* * * * *